United States Patent [19]

Wooldridge

[11] 4,120,364

[45] Oct. 17, 1978

[54] AUTOMATIC CONTROL DEVICE FOR TRACTOR MOUNTED TOOLS

[75] Inventor: Darrel M. Wooldridge, Oakland, Calif.

[73] Assignee: American Tractor Equipment Corporation, Oakland, Calif.

[21] Appl. No.: 773,954

[22] Filed: Mar. 3, 1977

Related U.S. Application Data

[63] Continuation-in-part of Ser. No. 570,034.

[51] Int. Cl.² .......................................... A01B 63/111
[52] U.S. Cl. .......................................... 172/2; 172/4
[58] Field of Search ..................... 172/2, 4, 4.5, 7, 9, 172/239, 465, 484, 430; 37/DIG. 1

[56] References Cited

U.S. PATENT DOCUMENTS

| | | | |
|---|---|---|---|
| 3,539,018 | 11/1970 | Sprenkel | 172/484 |
| 3,860,074 | 1/1975 | Maistrelli | 172/7 |
| 4,031,964 | 6/1977 | Takahashi et al. | 172/9 |
| 4,044,838 | 8/1977 | Wooldridge | 172/2 |

FOREIGN PATENT DOCUMENTS

296,951 3/1971 U.S.S.R. ................................. 172/430

*Primary Examiner*—Richard T. Stouffer
*Attorney, Agent, or Firm*—Robert H. Eckhoff

[57] ABSTRACT

A tractor mounted tool employs a programmable control device to change the angular attitude of the tool to a work surface at a preselected depth and also indicate the relative depth at which the tool is working. The control device positions a diverter valve to apply fluid power alternately between a depth positioning power cylinder and a pitch positioning power cylinder such that the attitude of the tool is automatically changed between a penetrating mode and a working mode at a preselected depth. A depth control circuit having a depth sensor and a depth selector which monitor the depth position of the tool in relation to a preselected depth and provide an output command when the tool is detected at the preselected depth. A pitch control circuit having a pitch sensor and a pitch selector which monitor the angular displacement of the tool and provide an output command at a preselected pitch. A control is connected to the depth and pitch control circuits and responsive to their commands to shift the position of the diverter valve and direct fluid power from the depth positioning cylinder to the pitch positioning cylinder when the tool is detected at a preselected depth and alternately shifts the diverter valve to redirect fluid power to the depth positioning cylinder when the tool is detected at a preselected pitch. The sensor generates a varying signal which is a function of tool position. The selector also generates an inverse reference signal which is a function of a position scale. These signals are compared by a bridge circuit including null detector.

8 Claims, 10 Drawing Figures

AUTOMATIC CONTROL DEVICE FOR TRACTOR MOUNTED TOOLS

This is a continuation-in-part application of my copending application Ser. No. 570 034, filed Apr. 21, 1975, and entitled AUTOMATIC CONTROL FOR RIPPER TOOL, now U.S. Pat. No. 4,044,838 of Aug. 30, 1977.

BACKGROUND OF THE INVENTION

Tractor mounted tools, such as ripper devices, perform at their optimum when their angular attitude is changed from a penetrating mode to a working mode at a selected depth, as outlined in my copending application. This change is accomplished in a reoccurring sequence and lends itself to automatic control. In the disclosure of the aforementioned application, a depth sensor switch and a depth selector switch were series connected in a depth control circuit. A pitch sensor switch and a pitch selector switch were series connected in a pitch control circuit. The depth control circuit and pitch control circuit were series connected with a control means in a control circuit. The depth sensor switch was composed of a plurality of contacts electrically connected to corresponding contacts on the depth selector switch. Similarly, the pitch sensor switch was composed of a plurality of contacts electrically connected to corresponding contacts of the pitch selector switch. This required a separate connecting wire between each corresponding contact pair of the sensor switches and selector switches and necessitated a large cable bundle from the sensor switches which were on the tool mount to the selector switches in the control console. Also provision had to be made to reset the control device if the sensor actuator arms ever over-traveled the end points of the sensor switch contacts. An added objection was the necessity of using three switch arrays in the depth indicator circuit. Because of the adverse conditions under which these devices work, including dirt, moisture, vibrations, etc., it is important to keep the number of components to a minimum and especially to protect the sensor switches by sealing them from contaminants.

SUMMARY OF THE INVENTION

A principal object of the present invention is to monitor the position of a tractor mounted tool by utilizing a sensor device that detects the position of the tool and generates a variable output signal which is a function of the instantaneous position of the tool. The output signal may be used to control the position of the tool or to indicate its relative position.

Another object of the present invention is to provide an automatic control device which may be programmed to change the angular attitude of a tool at a preselected elevation by monitoring the elevation and angular attitude of the tool with sensor devices that change in relative potential depending on the instantaneous elevation and attitude of the tool and comparing the output potentials of the sensor devices with the output potential from pre-programmed angular and elevation selector devices.

A further object is to provide a control device which monitors the voltage drop across a variable resistance in a sensor device that is directly proportional to the position of the tool and to compare the relative voltage from the sensor device with a reference voltage of a preselected setting on a selector device. The two voltages are of inverse polarity and are compared across a null detector such that a command signal is generated when the voltages are substantially matched and thus indicates that the tool is at the preselected position.

Yet another object is to provide such a control device wherein the change in resistance is made in consecutive incremental steps such that consecutive tool positions are sharply delineated.

DESCRIPTION OF THE PREFERRED EMBODIMENT

Figure 1:
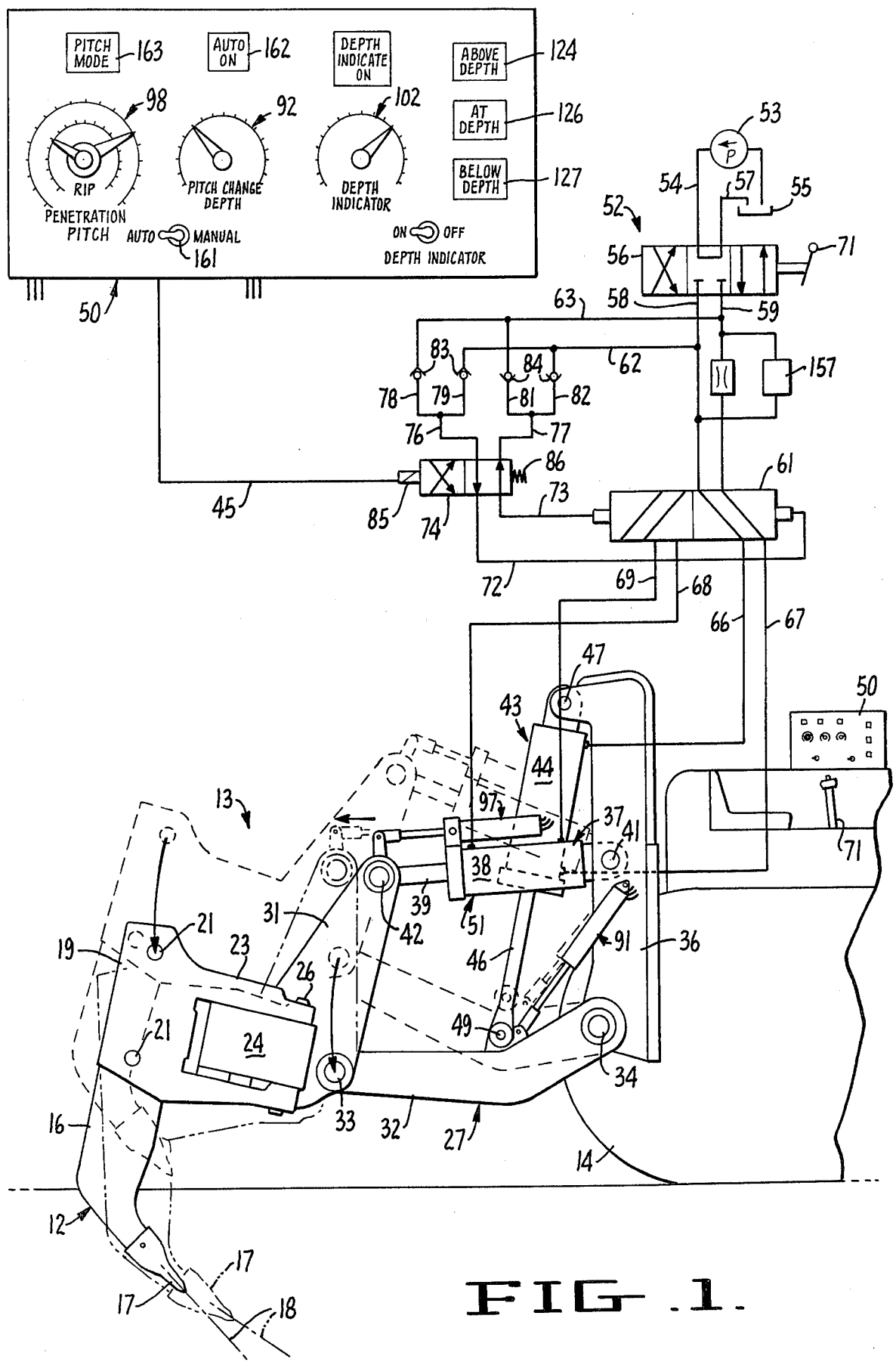
FIG. 1 is a diagrammatic view of a tractor mounted tool and control device therefor.

In FIG. 1 there is shown a tractor mounted tool 12 having an articulated tool mount 13 for attachment to the rear of tractor 14. Tool 12 may take the form of a ripper device having an upstanding shank 16 terminating at its lower end in a forwardly extending portion on which replaceable ripper blade 17 is affixed. Ripper blade 17 has a chisel shape and tapers toward the leading edge about a horizontal medial plane 18. The angular attitude or pitch of the tool is defined by this plane.

The upper end of shank 16 is connected to shank bracket 19 by pins 21. Shank bracket 19 has a forwardly extending yoke 23 pivotally carried on tool beam 24 so that the ripper may swivel about vertical pin 26 and track the course of the tractor. Tool beam 24 is an elongated horizontal member extending transversely across the rear of the tractor and may support a plurality of ripper shanks thereon.

Articulated tool mount 13 is in the form of a link mechanism 27 combining a series of links to support the tool beam and associated tools for angular and vertical movement relative to the tractor. While the links are in laterally spaced pairs across the rear of the tractor, only one set will be described. Upstanding link 31 is rigidly attached to tool beam 24. Lower trailing link 32 is pivotally attached to the lower end of upstanding link 31 by pin 33 and extends therefrom to pivot pin 34 on the lower end of support bracket 36. Support bracket 36 is vertically positioned and rigidly attached to the rear of tractor 14. Upper link 37 is formed by cylinder 38 and piston rod 39. The inner end of cylinder 38 is pivotally attached to support bracket 36 by pin 41 while the outer end of piston rod 39 is carried by pivot pin 42 at the top of upstanding link 31. Applying fluid power to one end or the other of a piston in cylinder 38 allows the geometry of the link mechanism to be changed as described hereinafter.

Depth positioning means 43 is operatively connected to tool mount 13 and is formed to raise the lower ripper tool 12. Depth positioning cylinder 44 and piston rod 46 are situated between the laterally spaced pairs of links and extend from the top of rear support bracket 36 to lower trailing link 32. The upper end of cylinder 44 is pivoted on pin 47 and the distal end of piston rod 46 is pivoted on link 32 by pin 49. Fluid power alternately applied to the operative ports of the ends of cylinder 44 will alternately raise the tool mount to an elevated position adjacent rear support bracket 36 as shown in dotted line in FIG. 1 and alternately lower the tool mount to a position overlying the surface of the ground where ripper tool 12 will penetrate the ground, as shown by the solid lines in FIG. 1.

Similarly, pitch positioning means 51 is formed by cylinder 38. Fluid power alternately applied to the operative ports at the ends of cylinder 38 will alternately swing link 31 about pin 33 and change the pitch of ripper tool 12 as shown in the dot-dash lines in FIG. 1.

As mentioned hereinbefore, it is desirable to have the pitch of the ripper blade at a steep angle when penetrating the ground and then to change the pitch angle to a more shallow attitude at a preselected depth for the ripping operation. It is for this change that an automatic control means is provided to apply fluid power selectively to cylinder 44 and cylinder 38 in the proper sequence.

As shown in the upper part of FIG. 1, fluid circuit 52 is provided which is controlled by output line 45 of an electrical control circuit housed in console 50. Console 50 is housed in the cab of tractor 14 and presents on its face plate, dials and visual display for preselecting settings and indicating the conditions under which the control is working.

Fluid circuit 52 includes pump 53 supplying hydraulic fluid under pressure to line 54 from reservoir 55. Pressure line 54 leads to manually operated control valve 56 while drain line 57 leads from valve 56 to reservoir 55. Control valve 56 is a four-way three position valve which can connect pressure and drain lines 54 and 57 to first and second conduit lines 58 and 59 or to close the conduit lines and recycle fluid from pump 53 back to reservoir 55. Conduit lines 58 and 59 are connected to diverter valve 61 and also have branch lines 62 and 63. Diverter valve 61 is well-known in the trade and diverts fluid from conduit lines 58 and 59 to either lines 66 and 67 or lines 68 and 69. Lines 66 and 67 lead respectively to the top and bottom operative ports of depth positioning cylinder 44 while lines 68 and 69 lead respectively to the rear and front operative ports of the pitch positioning cylinder 38. From the foregoing circuit, it will be seen that by proper manipulation of manual control valve 56 and diverter valve 61 fluid power from pump 53 may be applied to the depth positioning cylinder 44 to depress or elevate the ripper tool or to apply fluid to the pitch positioning cylinder 38 to flatten or steepen the pitch angle of the ripper blade. Also, it should be noted that manual control valve 56 selects the direction of travel of the cylinder pistons by alternately connecting pressure and drain lines 54 and 57 to conduit lines 58 and 59, while diverter valve 61 selects the cylinder to which conduit lines 58 and 59 are connected and determines which cylinder is operational at any one time.

Manual control valve 56 is shifted by hand stick 71 provided in the cab of the tractor 14. Diverter valve 61 is shifted by fluid pressure from branch lines 62 and 63 and lines 72 and 73 as directed by electrically operated control valve 74. Control valve 74 is a solenoid actuated four-way two position valve having inlet pressure and exhaust lines 76 and 77 connected to branch lines 62 and 63 in tandem through lines 78 and 79 and lines 81 and 82. Lines 78 and 79 have check valve 83 while lines 81 and 82 have check valves 84 positioned in the opposite direction. Thus, line 76 will have pressure and line 77 will be at exhaust irrespective of the condition of conduit lines 58 and 59.

Electrically operated control valve 74 is shifted by solenoid 85 or return spring 86 in response to the presence or absence of an electrical command from output line 45 of an electrical control means in console 50. The generation of this signal will be described in detail later, but in the instant invention the command signal is initiated when the ripper tool is detected at some preselected depth and the command is terminated when the ripper tool is detected at some preselected pitch. Thus, as the operator directs fluid power through manual valve 56 to conduit line 58, the fluid will first be applied to depth positioning cylinder 44. When the ripper tool is detected at some preselected depth, a control command is initiated and control valve 74 will change the position of diverter valve 61 to apply fluid to pitch positioning cylinder 38.

Thereafter, when the ripper tool is detected at some preselected pitch, the command will be terminated and control valve 74 will reposition diverter valve 61 to once again apply fluid power to depth positioning cylinder 44. This sequence will work in both the descending and ascending modes of operation. It will be seen that the only action the operator has to make is to direct fluid to either lower or raise the ripper tool and that the pitch of the tool will automatically be changed at a preselected depth. Thus by preselecting on the console switches the desired raised pitch and rip pitch settings and the depth at which the pitch change will occur, an automatic and reoccurring sequence is performed without the conscious effort of the operator.

Figure 2:
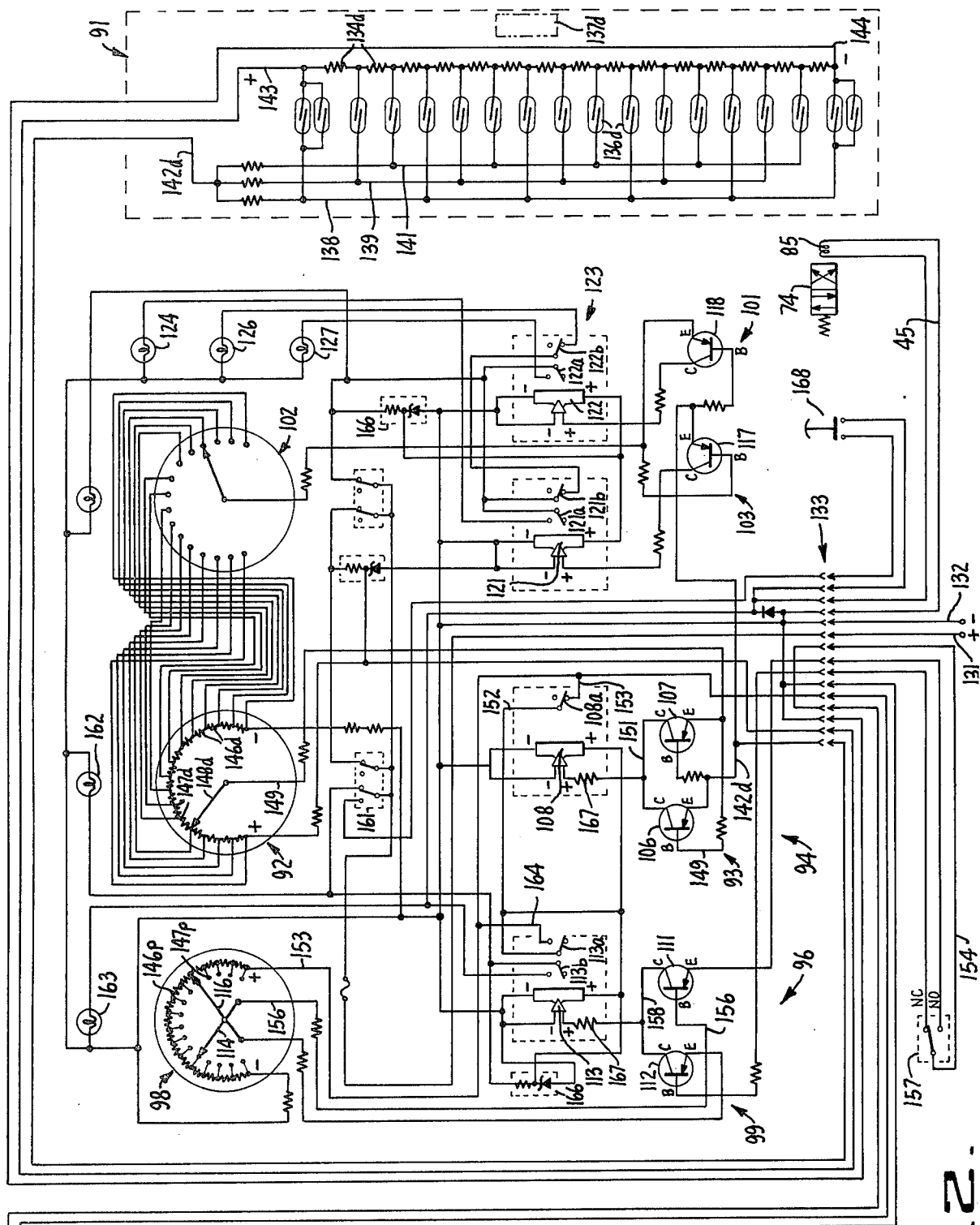
FIG. 2 is an electrical schematic view of the electrical control circuit used in the present invention.
Figure 3:
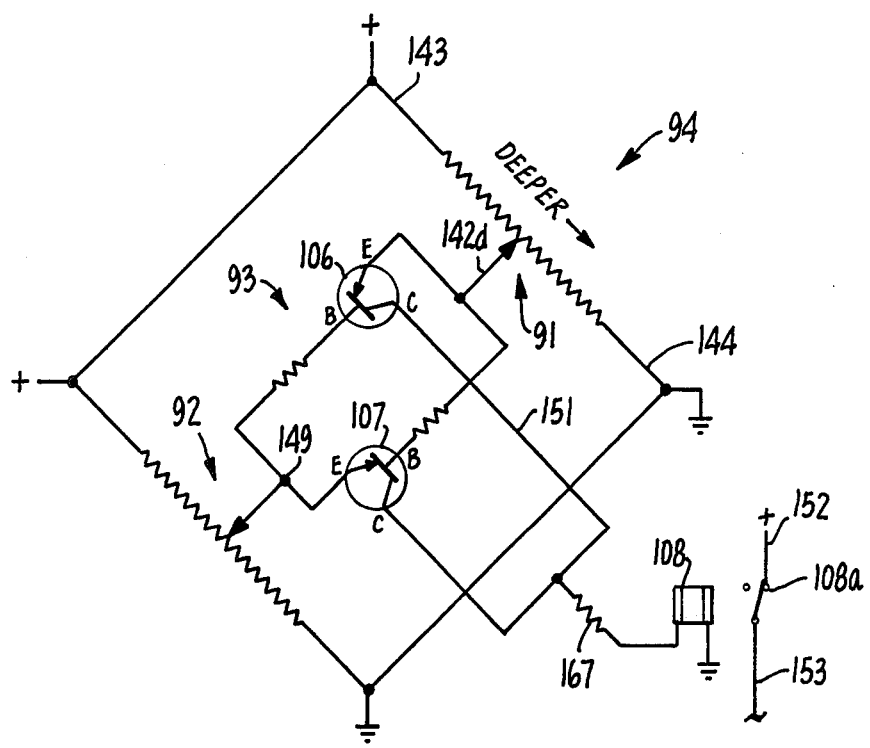
FIGS. 3, 4 and 5 are schematic views of individual sub-systems of the electrical control circuit.
Figure 4:
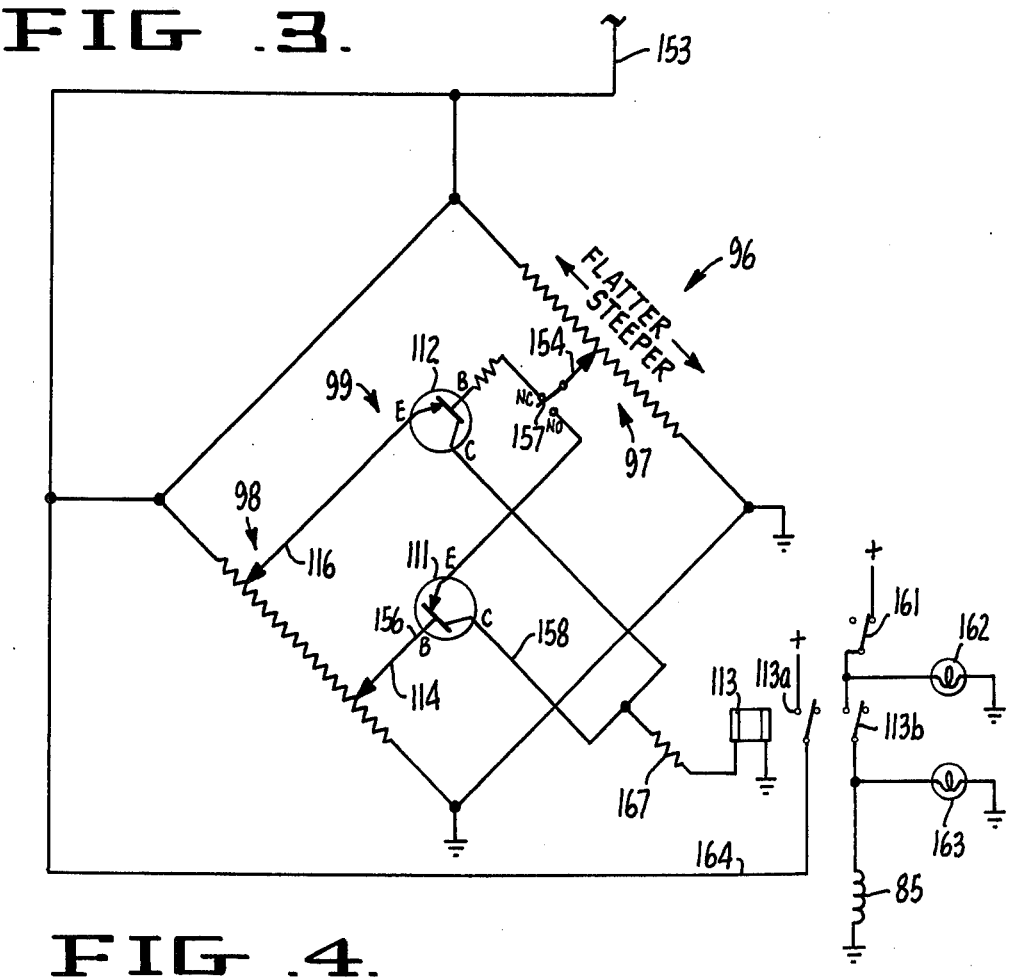
Figure 5:
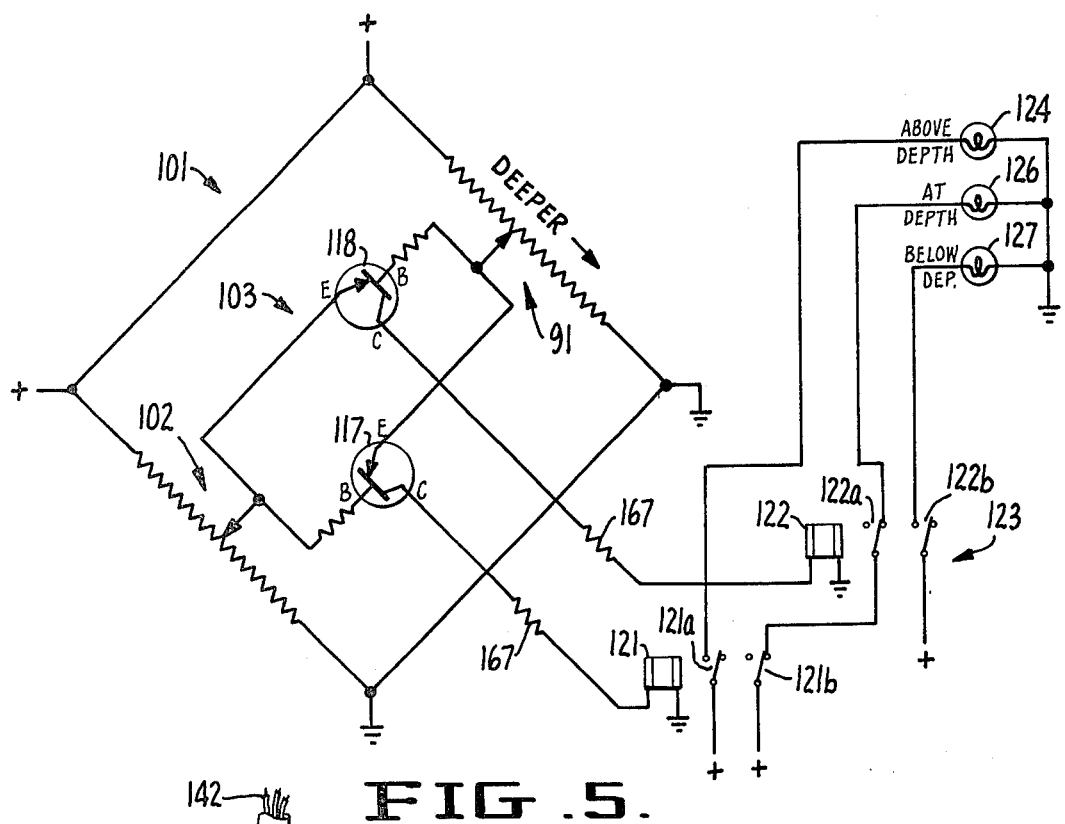

Looking to the schematic drawing in FIG. 2 and in FIGS. 3, 4 and 5, a few general observations may be made. Depth sensor means 91 and depth selector means 92 are connected with depth control means 93 in a depth control circuit 94. The depth control means 93 will provide a command when the tool is detected at some specified depth as preselected by the depth selector means 92. The function of the depth control circuit 94 is to energize the pitch control circuit 96 when the tool is detected at a preselected depth. The pitch control circuit 96 supplies a command signal to control line 45 in order to shift control valve 74 and diverter valve 61 and continues to do so until the tool is detected at a preselected pitch. Pitch sensor means 97 and pitch selector means 98 are connected with a pitch control means 99 in a pitch control circuit 96. The pitch control means 99 will provide a command when the tool is detected at some specified pitch as preselected by pitch selector means 98. A depth indicator circuit 101 is formed by depth sensor means 91, depth indicator selector means 102 and depth indicator control means 103. The depth indicator control means 103 will provide an indication of whether the tool is detected by the depth sensor to be "above", "at" or "below" the specified depth as preselected by the depth indicator selector 102.

As shown schematically in FIGS. 2 and 3, the depth sensor 91 and depth selector 92 are in the form of bridge connected voltage dividers and the depth control 93 is in the form of a pair of transistors 106 and 107 and relay 108 that function as a null detector between the voltage dividers. When the potential difference between the sensor 91 and selector 92 is below the triggering voltage of the transistors, the transistors will become non-conducting and de-energize relay 108. Two transistors 106 and 107 are interconnected with the voltage dividers in such a way that one of them will be conducting when the potential difference is positive and the other when the potential difference is negative. Thus, one transistor will be conducting when the power cylinders are extending or retracting above the set point on depth selector 92 and one transistor will be conducting when the power cylinders are extending or retracting below the set point on depth selector 92. Relay 108 actuates the pitch control circuit 96 through line 153.

As shown schematically in FIGS. 2 and 4, the pitch sensor 97 and pitch selector 98 are in the form of bridge connected voltage dividers and the pitch control 99 is in the form of a pair of transistors 111 and 112 and relay 113 that function as a null detector between the voltage divider. Pitch selector 98 provides two offset potentials to the pitch control 99, one from arm 114 for selecting the rip pitch mode and one from arm 116 for selecting the penetration pitch mode. Transistor 111 is connected to arm 114 and will energize relay 113 as the tool is moving toward the working pitch setting when the tool is descending. Transistor 112 is connected to arm 116 and will energize relay 113 as the tool is moving toward the penetrating pitch setting when the tool is ascending. Relay 113 actuates solenoid 85 of electrically controlled valve 74.

As shown schematically in FIGS. 2 and 5, the depth indicator control circuit 101 is composed of the depth sensor 91 and the depth indicator selector 102 which are in the form of bridge connected voltage dividers and a depth indicator control 103 in the form of a pair of transistors 117 and 118 that function as a detector between the voltage dividers. In FIG. 2, the depth indicator selector 102 is a rotary switch having switch contacts connected with corresponding switch contacts of the depth selector 92. This allows the resistance network of the depth selector 92 to be utilized in both the depth control circuit 94 and the depth indicating circuit 101. Similarly, depth sensor 91 is connected in parallel with depth control circuit 94 and depth indicating circuit 101. Transistors 117 and 118 are respectively connected to energize relays 121 and 122 which in turn have relay control contact network 123 which supplies power to indicating lamps 124, 126 and 127 depending on whether transistor 117 or transistor 118 or neither is conducting. Transistor 117 will be conducting when the tool is above a preselected depth and this energizes relay 121 to close contact 121a and light "above depth" lamp 124. As the tool is lowered, the differential potential between sensor 91 and selector 102 will drop below the triggering voltage of the transistors and both relays will be de-energized to supply power through normally closed contacts 121b and 122a to light "at depth" lamp 126. If the tool is lowered further, transistor 118 will conduct to energize relay 122 and close contacts 122b and light "below depth" lamp 127. Since normally closed contacts 121b and 122a are opened whenever either relay is energized, the "at depth" lamp will not be lighted if either transistor is conducting.

Specifically looking to FIG. 2, power is supplied to the command circuit through lines 131 and 132 from a source on the tractor. Terminal block 133 isolates the components within the console from the exterior components. Negative or grounded voltage is supplied to the lower end of the voltage divider networks of the depth sensor 91 and pitch sensor 97. Regulated positive voltage is supplied to the upper end of the voltage divider networks as will be described more fully hereinafter.

Figure 6:
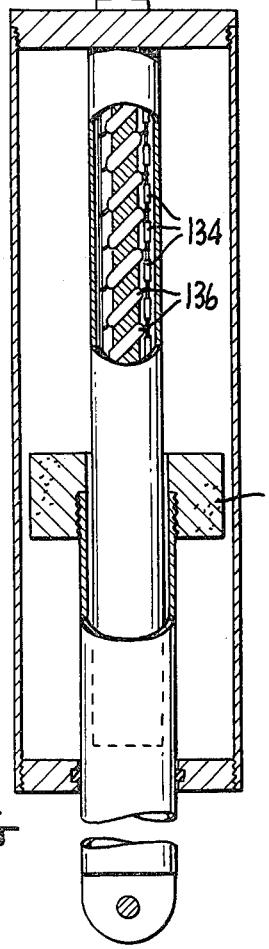
FIG. 6 is an elevational view of a typical sensor switch assembly used in the present invention.
Figure 7:
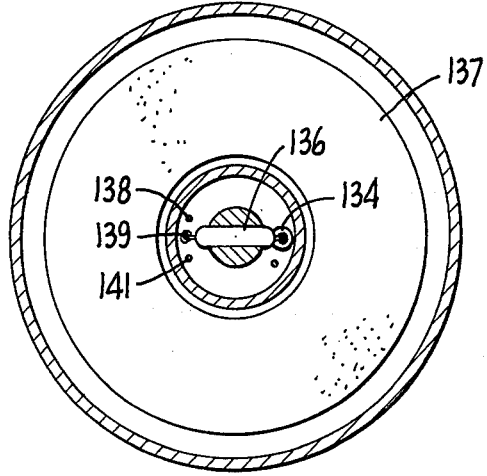
FIG. 7 is a cross-sectional view taken along the line 7—7 of FIG. 6.
Figure 8:
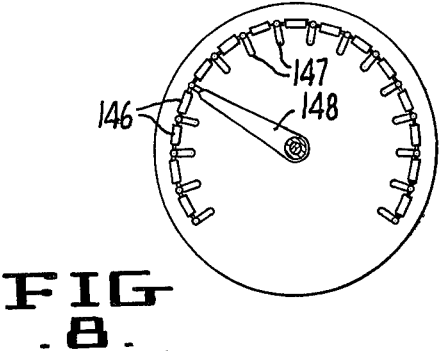
FIG. 8 is an elevational view of a typical selector switch assembly used in the present invention.

Each sensor (see FIGS. 6 and 7) is made up of a series of discrete resistor elements 134 and magnetic reed switches 136 tapped between each resistor element. A magnetic slider element 137 is connected to the tool mount and closes corresponding reed switches as the tool moves. Slider 137 is dimensioned to actuate two or three reed switches depending on the position of the tool. The other sides of the series of reed switches 136 are alternately connected to either line 138, line 139 or line 141 which are in turn interconnected to sensor output line 142. As slider 137 moves along the sensor, the confronting reed switches 136 will be closed and supply an output along line 142 which will be a function of the included resistor elements of the network. As an example, if the resistance elements have a value of 82 ohms and the system has a 24 volt power supply, the voltage drop across each resistor element will be 1.6 volts and the output voltage will be the difference between the power supply and the voltage drop across the included resistors plus the average value of the resistors adjacent the closed reed switches. The resistance networks of the selectors (see FIG. 8) are also made up of a series of resistor elements 146 interconnected between positive and negative end terminals and providing taps and contacts 147 between each resistor element for a wiper contact arm 148. This arrangement provides a sharp differentiation of values to the output line that is a precise delineation of the position of the tool and of the selector scale. The value of the resistor elements 146 of the selectors is chosen to be of the same value as the resistor elements 134 of the sensors to create a direct corresponding relationship between the selector scale and the degree of tool movement. The transistors of the null detectors are of the PNP type and are connected in a common collector configuration and are driven through the sensor and selector means. The transistors may be chosen to have a triggering threshold potential of 0.6 volts such that the transistor will conduct if the emitter potential is more than 0.6 volts positive above the base voltage. There are a pair of transistors for each null detector. The outputs of the sensor and selector are alternately connected to either the base or emitter terminals of the different transistors such that one transistor will conduct if the differential potential is positive and the other transistor will conduct if the differential potential is negative.

Depth sensor 91 is shown at the right of FIG. 2 and has resistor elements 134d interconnected between positive potential line 143 and negative potential line 144. Magnetic reed switches 136d interconnect the resistor elements with output line 142d in a tertiary fashion. As magnetic slider 137d moves along the switch array, the potential of the output line will be changed as a function of the depth of the tool. As the magnetic slider moves downward indicating increased depth, the positive potential of output line 142d will decrease. Depth selector 92 is in the form of a rotary switch having a centrally pivoted wiper arm 148d and a circular array of contacts 147d. Resistor elements 146d are interconnected between adjacent contacts as shown in FIG. 2 and the end terminals are alternately connected to positive and negative potential. As the wiper arm is moved in a clockwise direction, denoting on a scale increased depth, the positive potential of the wiper arm will decrease. The outputs of the depth sensor 91 and depth selector 92 are compared at transistors 106 and 107. If the difference in potential of the output line 142d is above the triggering voltage of either transistor, an output will energize power relay 108. Conversely if the difference in potential is less than this triggering voltage, the relay will be de-energized.

The base "B" of transistor 106 is connected to the output line 149 from wiper arm 148d of depth selector switch 92. Emitter "E" of transistor 106 is connected to the output line 142d of depth sensor 91. Collector "C" is connected by line 151 to power relay 108 and provides power thereto when transistor 106 is conducting. This is accomplished if the negative potential difference of selector output line 149 to sensor output line 142d is greater than the triggering voltage. Transistor 107 has base "B" connected to line 142d, emitter "E" connected to line 149 and collector "C" to line 151 and will provide power to relay 108 when the aforementioned potential difference is of the opposite sign. As mentioned, if the potential difference drops below the triggering voltage denoting that the tool is detected at the preselected depth position, transistors 106 and 107 will quit conducting and relay 108 will be de-energized to move contact 108a to the normally closed position. Contact 108a joins line 152 which is supplied regulated positive voltage to line 153 leading to the positive side of the pitch sensor resistor network and the positive side of the pitch selector switch resistor network. This energizes the pitch control circuit 96.

Pitch sensor 97, shown at the left of FIG. 2, is similar to the depth sensor and has a resistance network made up of a series of resistor elements 134p connected between positive and negative end terminals. Magnetic reed switches 136p interconnect the resistor elements with output line 154 in a tertiary fashion. As magnetic slider 137p moves along the switch array, the potential of output line 154 will change as a function of the pitch of the tool. As the pitch flattens (cylinder extends), the potential of line 154 will become less positive. Pitch selector 98 is similar to the depth selector 92 and has a series of resistor elements 146p interconnected between positive and negative end terminals and providing taps and contacts 147p between each resistor element. A pair of wiper arms 116 and 114 preselect the raised or penetrating pitch setting and the ripping or working pitch setting. The arms are restricted in their movement so that the working pitch cannot be steeper than the raised pitch. Arm 116 preselects the steeper raised pitch while arm 114 preselects the flatter working pitch. Pitch control means 99 is formed by transistors 111 and 112 and relay 113. Transistor 111 has its base "B" connected to line 156 to working pitch selector arm 114, emitter "E" connected through normally open "NO" contact of differential pressure switch 157 to output line 154 of pitch sensor 97 and collector "C" connected through line 158 to power relay 113. There are two pitch change operations, one when the tool is descending and one when the tool is ascending. Transistor 111 is operational in the descending mode to change the pitch to the working position. Transistor 112 has its base "B" connected to output line 154 of pitch sensor 97 through normally closed "NC" contact of pressure switch 157, emitter "E" connected to wiper arm 116 and collector "C" connected to power relay 113. Transistor 112 is operational in the ascending mode to change the pitch to the raised pitch setting.

In operation, for automatic pitch control when the tool is lowered from a position with both the depth and pitch power cylinders fully retracted, toggle switch 161 is turned to the automatic position which supplies power to the control circuit as indicated by lighting "auto on" lamp 162. The penetrating pitch and working pitch are selected and the depth at which the pitch change is made is selected. Hand operated four-way tractor valve 56 is positioned to extend depth positioning means 43 and lower the tool. Differential pressure switch 157 is actuated to close the normally open contacts. Transistor 106 conducts to energize relay 108 and open contact 108a. As the depth sensor actuator 137d moves downward, the positive voltage drops in output line 142d until it substantially matches the voltage set on the depth selector 92. At this point, transistor 106 quits conducting, relay 108 is de-energized which releases contact 108a and completes the circuit to pitch sensor 97 and pitch selector 98 through line 153. Relay 113 is energized through transistor 111 and completes the circuit through contact 113b to supply power to solenoid 85 of valve 74 and "pitch change" indicating lamp 163. Relay 113 also supplies regulated positive potential through contact 113a and line 164 to the terminal ends of pitch sensor 97 and pitch selector 98 in case the set point is overshot by depth sensor 91. With current applied to the solenoid valve 74, pitch change means 51 is extended until either the differential potential between the pitch sensor 97 and pitch selector 98 (selector arm 114) comes to null or hand operated valve 56 is shifted and deactivates differential pressure switch 157. When the null position has been reached, transistor 111 quits conducting and de-energizes relay 113. Diverter valve 61 reconnects power to the depth positioning means 43 and downward motion of the tool is resumed.

For automatic pitch control when the tool is raised, hand operated valve 56 is positioned to retract depth positioning means 43. Differential pressure switch 157 moves to the normally closed position. As the tool is elevated, the output voltage of depth sensor 91 increases until it matches the voltage set on depth selector 92. At null, transistor 107 quits conducting, releases relay 108 and completes the circuit through contact 108a to the pitch control circuit 96. Relay 113 is energized through transistor 112 and closes contact 113b to complete the circuit to solenoid 85, "pitch mode" lamp 163 and also closes contact 113a to continue to complete the circuit to the pitch control circuit 96. With the diverter valve in the pitch change mode, pitch positioning means 51 retracts until the potential from sensor 97 compares with the potential from selector arm 116. When the preselected pitch position is arrived at, transistor 112 will quit conducting, de-energizing relay 113 and allow diverter valve 61 to be repositioned in the depth change mode. The transistors prevent polarity reversal and reactivation of the relay if the null point is overshot. Depth positioning means 43 will be reactivated to continue the upward motion until the manual tractor valve 56 is released or the cylinders reach the end of their stroke. When the manual valve 56 is released, differential pressure switch 157 continues to remain in the normally closed position.

As seen in the schematic drawings, other components are shown including voltage regulators 166, relay load resistors 167 and other balancing resistors. Also manual pitch change operation may be accomplished with manually operated switch 168.

Pitch selector 98 has been described as providing two offset potentials to the pitch control 99, one from switch arm 114 for selecting the rip pitch mode and one from switch arm 116 for selecting the penetration pitch mode. These switch arms were further described as being restricted in their movement so that the working, or rip, pitch cannot be made steeper than the raised or penetration pitch. This restriction of movement was provided by mechanical means between the two switch arms and necessitated that the operator identify the function of each switch knob and set the switch at the required higher or lower setting. Since the switch knobs are concentrically located, this requirement may lead to confusion.

Figure 10:
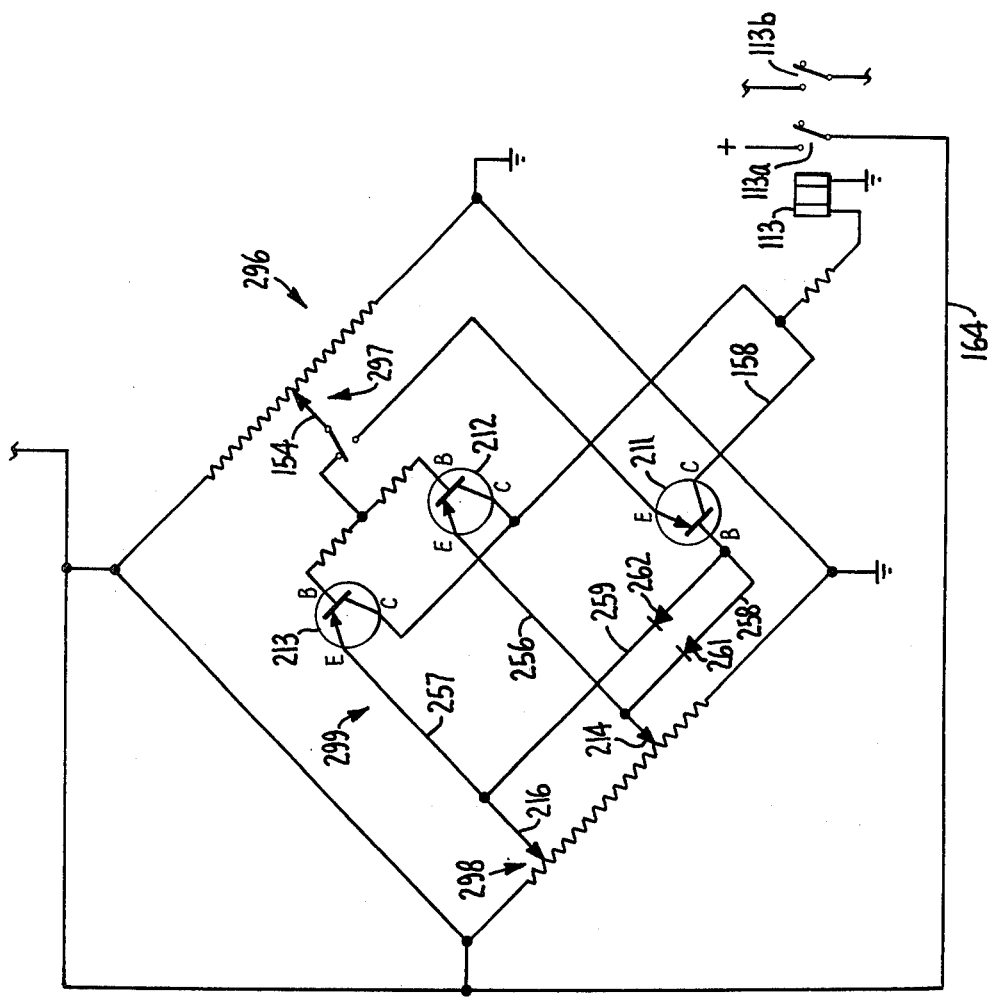
FIG. 10 is a schematic view of the sub-system utilizing the alternate embodiment of FIG. 9.
Figure 9:
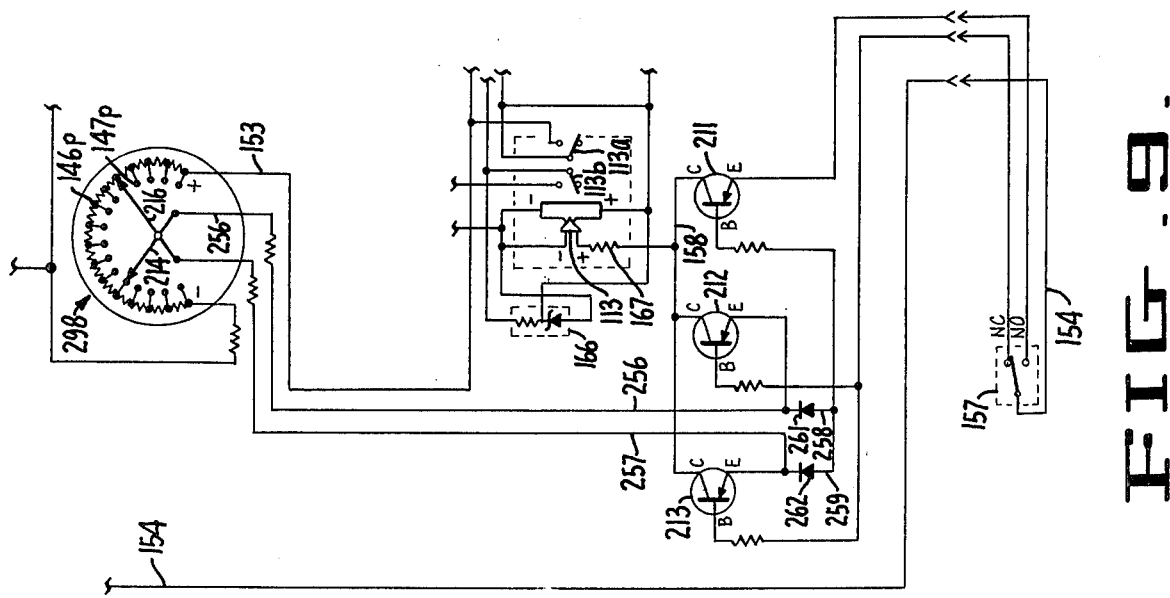
FIG. 9 is a partial schematic view of an alternate embodiment of the electrical control circuit.

This mechanical interlock may be replaced by an electrical interchange as shown schematically in FIGS. 9 and 10. In this pitch control circuit 296, pitch selector switch arms 214 and 216 are respectively connected by lines 256 and 257 to the emitter "E" of transistors 212 and 213. Branch lines 258 and 259 lead from lines 256 and 257 through isolation diodes 261 and 262 to the base "B" of transistor 211. This forms a symmetrical circuit between voltage dividers 297 and 298 and pitch control 299. In this configuration, each though switch arms 214 and 216 may be crossed over each other, either transistor 212 or 213 will form the null detector for the higher reference (penetration pitch) and transistor 211 will form the null detector for the lower reference (rip pitch).

While FIG. 2 illustrates the voltage dividers as made up of discrete resistor elements, they could be made up of potentiometers as illustrated in the schematic drawings of FIGS. 3, 4 and 5. Other devices may likewise be used which provide a variable output.

From the foregoing, it will be seen that an automatic control system has been disclosed which will indicate the relative position and also change the position of a tool in an automatic preselected manner.

I claim:

1. An improvement in a tractor mounted tool having a power operated tool positioning mount and a control circuit therefor which includes a depth control circuit having depth sensor means for detecting vertical displacement of the tool and generating an output signal in proportional relationship with the instantaneous position of the tool, a depth selector means connected in the depth control circuit with the depth sensor means and having means for displaying a preselected position setting of the tool and generating an output signal in proportional relationship with the preselected position, a pitch control circuit connected in the control circuit with the depth selector means, the pitch control circuit including a pitch sensor means for detecting angular displacement of the tool and generating an output signal in proportional relationship with the angular position of the tool, and a pitch selector means connected with the pitch sensor means, and control means connected in the circuit, the improvement comprising:

the depth and pitch control circuits each being connected together and each including a bridge connected voltage divider with the sensor and selector means of each circuit being a part of the bridge connected voltage divider associated with said each circuit; and the control means including null means connecting said sensor and selector means in each of said depth and pitch control circuits forming a null detector between each of said voltage dividers, a depth relay connected to a depth null means and a pitch relay connected to a pitch null means, said depth relay being de-energized when the potential difference between the depth sensor and the depth selector is below a triggering voltage of said depth null means, said control means of said depth and pitch control circuits each generating a control output signal when the sensor means output signal correspondingly compares with the selector means output signal thereby denoting that the power operated tool is at a preselected position, said pitch circuit control means being connected with said depth circuit and initiating a change in pitch of the tool when the tool is detected at a preselected depth.

2. The device as defined in claim 1 and wherein said sensor means each include a variable potential device and is adapted to vary the strength of the output signal in relation to the instantaneous position of the tool, said selector means each including a variable potential device and is adapted to vary the strength of the output signal in relation to a scale denoting relative position settings, and said control means including a detector responsive to the relative strengths of the sensor and selector output signals and adapted to initiate a control output when the relative strengths of the sensor and selector output signals are detected to be within a specified range.

3. The device as defined in claim 2 and wherein said each sensor means includes an actuating member formed for relative movement depending on the position of said tool and adapted to vary the strength of the output signal in relation to the said position of the tool, and said each selector means includes a variable resistance and an actuating member which is movable to vary the strength of the output signal in relation to a scale denoting preselected positions of the tool, and said control means being responsive to the relative strengths of said sensor and selector output signals and adapted to initiate a control output when the sensor and selector output signals are substantially matched in relative strength.

4. The device as defined in claim 3 and wherein said variable resistance of said sensor means includes discrete resistance elements connected to provide an incremental linear potential varying device, said variable resistance of said selector means includes discrete resistance elements connected to provide an incremental linear potential varying device wherein, said output signals from said sensor means and selector means will be in discrete increments and provide precise differentiable potentials across said null detector of said control means.

5. The device as defined in claim 1 including an articulated tool mount for supporting and positioning a tool relative to a tractor, a depth positioning fluid operated cylinder operatively connected to said tool mount and formed for changing the vertical displacement of the tool, a pitch positioning fluid operated cylinder operatively connected to said tool mount and formed for changing the angular displacement of the tool, a fluid power circuit for selectively applying fluid power to the said fluid positioning cylinders and having a source of fluid power, a fluid control valve formed for selectively directing fluid power to either a first fluid conduit or a second fluid conduit, a diverter valve formed for selectively communicating the first and second conduits to the operatively ports of either the depth positioning cylinder or the ports of the pitch positioning cylinder, control means formed for positioning the diverter valve, said control means responsive to the control output of the depth control circuit wherein said diverter valve is positioned to direct fluid to the pitch positioning cylinder when the tool is detected at a specified vertical displacement.

6. The device as defined in claim 5 wherein said control means is responsive to the output of said pitch control circuit wherein said diverter valve is positioned to direct fluid to the depth positioning cylinder when the tool is detected at a specified angular displacement.

7. The improvement defined in claim 1 wherein said null means each includes a pair of transistors.

8. The improvement defined in claim 7 wherein said transistors are interconnected with said voltage dividers so that one of said transistors will be conducting when said potential difference is positive and the other one of said transistors will be conducting when said potential difference is negative.

* * * * *